ABRAHAM MUTERSBAUGH.

Improvement in Bee Hives.

No. 120,766.  Patented Nov. 7, 1871.

Witnesses.
Wm A. Mix
H. H. Young

Inventor
Abraham Mutersbaugh,
By his Attorney,
T. H. Upperman

UNITED STATES PATENT OFFICE.

ABRAHAM MUTERSBAUGH, OF LEWINSVILLE, VIRGINIA.

IMPROVEMENT IN BEE-HIVES.

Specification forming part of Letters Patent No. 120,766, dated November 7, 1871.

*To all whom it may concern:*

Be it known that I, ABRAHAM MUTERSBAUGH, of Lewinsville, in the county of Fairfax and State of Virginia, have invented certain new and useful Improvements in Bee-Hives; and I do hereby declare that the following is a full, clear, and exact description thereof, reference being had to the accompanying drawing which makes part of this specification, and in which—

Figure 1:
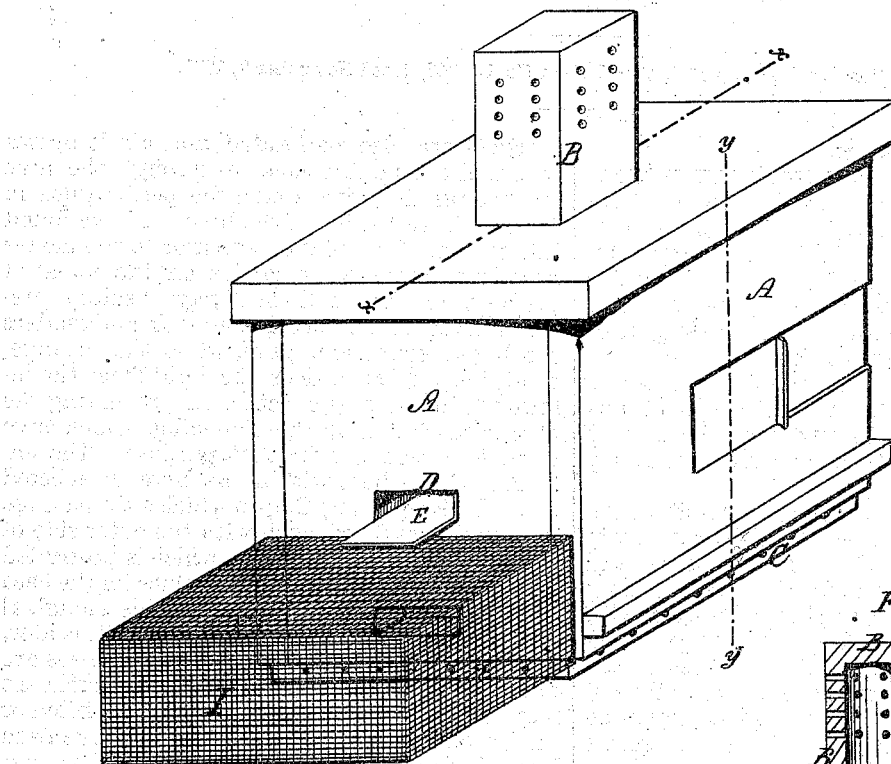
Figure 2:
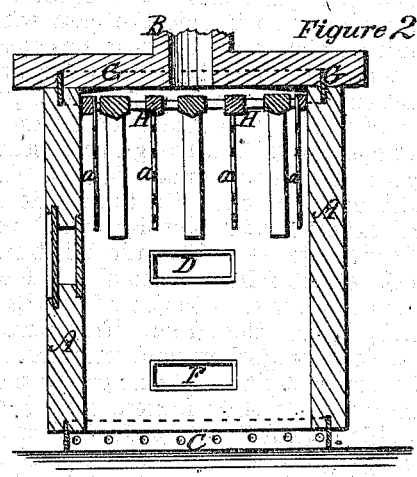
Figure 3:
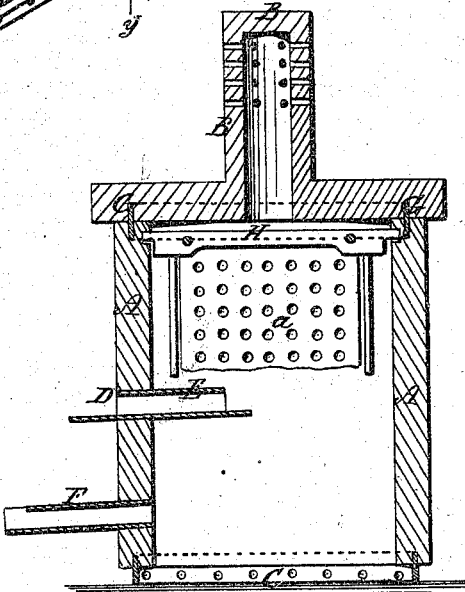

Figure 1 is a perspective view of a bee-hive embracing my improvements. Fig. 2 is a transverse vertical section through the line $x$ $x$ of Fig. 1. Fig. 3 is a like view through the line $y$ $y$, same figure.

My invention consists: First, in mounting the hive upon sheet-iron plates inserted vertically in the vertical sides thereof, to admit air under and within the hive, (the said vertical plates being perforated for that purpose,) in combination with the cupola on the top of the hive, also provided with perforations to admit of the egress of the air; said plates also serving to prevent the entrance of the bee-moth into the hive, as will be further described. Second, in the arrangement of the ingress and egress passages for the bees into and out of the hive, whereby the bee, miller, and robber bees are brought immediately within the swarm of bees in such numbers only as that they are easily killed or driven out, as will be hereinafter described. Third, in breaking the joints between the vertical sides and top of the bee-hive by the insertion of vertical plates of metal extending equally into said top and sides, which, though the box may become warped by exposure, will effectually prevent the entrance of the bee or moth, as will be hereinafter described. Fourth, in the attachment, to the front of the box, of a casing of wire, encompassing one of the openings made in the hive, as a safety-guard to the escape and loss of the bees when they emerge from the hive in the spring of the year, as will be hereinafter described.

In the accompanying drawing, A represents the box constituting the bee-hive, provided at its top with a cupola, B, having perforations therein for the purpose of ventilation. The box is mounted upon four sheet-iron plates, C, let into the vertical sides thereof a distance about half their width, to prevent the entrance of the bee-moth within the hive or its laying and hatching out its eggs under the timbers of the box. These plates C are also perforated, and air is drawn within these perforations up through the hive and makes its exit through the perforations in the cupola on the top of the hive. I have found this system of ventilation superior to the modes usually adopted, as it carries off the sweat of the bees and keeps them always healthy, prevents the comb from becoming black, and renders the honey sweet and pure, while the arrangement, keeping as it does the light from the interior of the hive, is effectual in preventing the bees from sealing up those openings which have heretofore been left for that purpose. The entrance of the bees within the hive is effected through the opening D, into which a tin passage or spout, E, is fitted flush with the outer side of the box, except at its bottom, which is protruded outwardly to form an alighting place for the bees in their passage into the hive. This trough E extends inwardly into the hive to near its center, and is so arranged as that the robber bees are prevented from getting into the hive in sufficient numbers at a time to rob it, they being killed or driven out by the swarm within the hive from being brought immediately in their midst; and particularly so is this the case with the bee-miller, which insect is never the cause of trouble to a swarm until the cool of the evening. At that time the bees are huddled together at the top of the hive and immediately around the inner opening of the trough or passage E. The egress-trough or passage F is, on the contrary, flush on its inside with the inside of the box, and extends outwardly from the box a distance of several inches. Through this trough the robber-bees and millers are unable to find their way into the hive, while the bees from the inside have ready egress therefrom. This arrangement of double passage from and into the hive affords the bees every protection against the attacks of insects, while their ingress to and egress from the hive is much facilitated. To render the hive proof against the entrance of bee-moths at the junction of the top and sides should the box become warped, at which point much trouble is experienced in preventing such entrance, sheet-iron plates G are inserted in the vertical sides of the box, which project a like distance in its top. This not only serves to prevent the sides of the box from warping, but serves, by breaking joint, as described, to prevent the entrance of the insects named, and also to keep the light from penetrating the joints of the box, which, if done, causes the bees to stop work until the joints have been sealed up and made dark. A great advantage is obtained by the employment of the intermediate racks H between the comb-racks of the hive. These are constructed of a thickness of paper, a, attached to the said intermediate rack in any suitable manner, and perforated so as to allow of the ready passage of the bees through them; but its use in the manner specified serves to act as a partition between the several combs of honey, preventing the bees from joining them together, so that any desired quantity may be removed without detriment to that remaining. Heretofore much trouble has been experienced in severing the honey desired to be taken away from that to be left. My arrangement entirely obviates this difficulty. It will be seen, by reference to the drawing, that a casing of wire, I, is attached to the box at its front end, encompassing the egress passage F of the hive. This casing is, however, only intended to be used in the spring of the year, when so great a loss is experienced in a hive of bees by their emerging from the hive during the heat of the day, and their destruction by cold before they can return. When the casing is used the ingress passage E is sealed up and the trough or passage F of the egress opening removed, leaving only the opening in the side of the box, through which the bees emerge into the casing, get the warmth of the sun and water, empty themselves, and return to the hive. This loss of bees in the spring, a time when they are most needed, has been a serious drawback to their propagation and the production of honey.

From the foregoing it will be seen that every provision has been made for the health of the bees, and their security against attacking or troublesome insects rendered certain.

A practical test has shown the hive herein described to be possessed of many advantages over those in common use, and the honey made therein to be better in quality, from the thoroughness of ventilation, than that made by the old method.

Having described my invention, I claim—

1. Mounting the box upon the perforated sheet-iron plates C, in combination with the cupola likewise perforated, for the purpose of ventilation, while light is excluded from the interior of the hive, the said plates C also serving to insure the hive against depredation by the bee-moth, as herein shown and described.

2. The arrangement of the ingress and egress passages E F of the hive for protecting the swarm against the attacks of robber bees and the depredation of the bee-miller, in combination with the wire-netting I attached to the box and encompassing one of the openings of the hive, the latter to be used as a safety-guard to the escape and destruction of the bees when they emerge in the spring, as herein shown and described.

3. The employment of sheet-iron plates G to break the joints of the sides and top of the hive, in the manner and for the purpose described.

In testimony whereof I have hereunto signed my name.

ABRAHAM MUTERSBAUGH.

Witnesses:
WM. A. MIX,
CHAS. E. UPPERMAN.

(9)